(No Model.)

E. BAKER.

APPARATUS FOR DETERMINING A SHIP'S DISTANCE FROM AN OBJECT.

No. 499,495. Patented June 13, 1893.

WITNESSES:
Albert Popkins
Will T. Norton

INVENTOR
E. Baker
BY
Howson & Howson
ATTORNEYS.

UNITED STATES PATENT OFFICE.

EDWIN BAKER, OF CARDIFF, ENGLAND.

APPARATUS FOR DETERMINING A SHIP'S DISTANCE FROM AN OBJECT.

SPECIFICATION forming part of Letters Patent No. 499,495, dated June 13, 1893.

Application filed December 27, 1892. Serial No. 456,412. (No model.)

*To all whom it may concern:*

Be it known that I, EDWIN BAKER, a subject of the Queen of Great Britain and Ireland, and a resident of Cardiff, county of Glamorgan, Wales, England, have invented an Improved Apparatus for Determining a Ship's Distance from an Object, of which the following is a specification.

The object of this invention is to construct an improved apparatus for readily determining or indicating a ship's distance from an object, a point of land, a light house, or a light vessel; and which is exceedingly simple and easily manipulated.

It consists of a flat base card or plate having a disk with a central point around which is drawn a number of circles to represent miles of distance and portions of miles; through the center of these circles a line is drawn called the line of ship's course with "Ship's Head" marked at one end; outside the circles of distance is an annular ring marked with degrees or points of the compass which may be adjustable to the ship's course. Attached to the central point are two bars so constructed that they radiate from a common center and preferably cross at the center like a pair of scissors and having their inner edges capable of being placed together to form one diametrical bearing line right across the center of the instrument. When separated their inner edges form two diametrical bearing lines crossing each other and the distance circles at the central point. A separate scale is provided to represent the distance run by the ship, which scale is marked by the same standard as the circles of distance.

Figure 1:
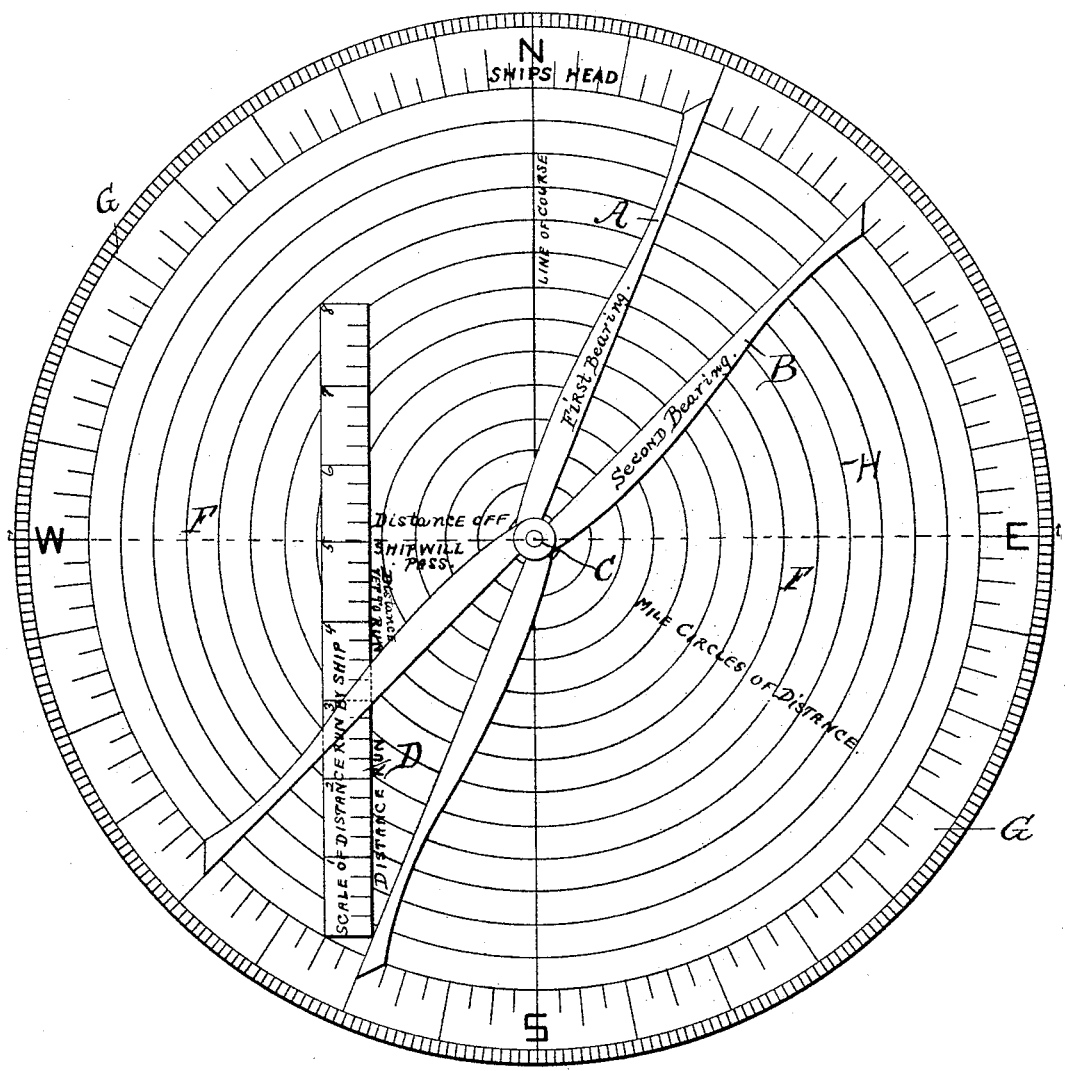
Figure 2:
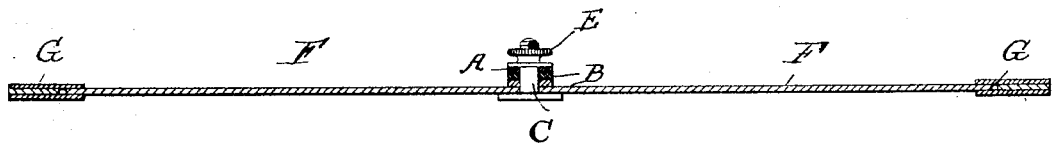

Referring to the accompanying drawings, Figure 1, is a plan view of my device. Fig. 2, is a sectional view through W—E of Fig. 1.

A and B represent the two bearing bars crossing at the center of the device as shown; C, the pivot or bearing pin; D, distance scale; E, the thumb screw for adjusting; F, the disk card; H, the circles of distance; and G, the annular ring marked with the points or degrees of the compass, and which ring may be adjusted or set to the ship's course.

The instrument is used in the following manner: Take a bearing, preferably by the ship's compass, of an object to which you fix the first bearing line; then the ship runs her course for any desired distance, and another bearing is taken to which the second bearing line is fixed. Then lay the scale parallel to the line of course, on that side of the instrument that is opposite to the object, and move it to or from the center (keeping it parallel to the said line) until the distance run just touches the inner edge of the the bearing bars; the number of circles from the center to the point of intersection will correspond with the distance from the object when each of the bearings was taken; the edge of the scale will also show the distance yet to run to reach the nearest point to the object and the circles will indicate what that distance will be. The edge of the scale, it will be observed, forms a line of position past the central point of the instrument corresponding with the line of the ship's course past the object sighted; and it will also be seen that the device as thus used further serves to guide the officer of the vessel in determining how far it may be necessary or desirable to alter the ship's course to avoid a dangerous object of known position; for the straight line drawn at right angles to the scale passing through the center of the instrument will be the measure of distance from the vessel to said object. It is apparent that any number of circles of distance drawn to any size or scale and any suitable material may be employed in making the instrument, which may be mounted on gimbals or otherwise in a suitable case, pedestal or stand. And it is also obvious that any suitable means for illuminating the instrument for night service may be employed, and further any suitable clamping device or other adjustable parts of the instrument or any suitable sight vanes may be used; all of which details may be varied without departing from the spirit of my invention and to which I do not wish to limit myself.

What I claim as my invention is—

1. In a distance indicator the combination with a disk card marked with circles of distance, a pivoted bearing bar, and a distance scale, substantially as described.

2. The combination with an annular compass card of a disk card provided with circles of distance, a bearing bar, and a distance scale, substantially as described.

3. The combination, in a distance indicator, with a disk card marked with circles of distance of two bearing bars radiating from the center thereof, and a scale for distance, substantially as and for the purposes set forth.

4. The combination with a central disk card of an annular compass card marked "Ship's Head," two bearing bars crossing the center of said disk card, and a distance scale, substantially as and for the purposes set forth.

5. The combination with a disk card provided with circles of distance of two bearing bars pivoted at the center of said card, and having the opposite edges in diametrically straight lines, passing through the center, and a distance scale, substantially as and for the purpose set forth.

In testimony whereof I have signed my name to this specification in the presence of two subscribing witnesses.

EDWIN BAKER.

Witnesses:
JAMES HOUGHTON,
THOS. McDONALD.